United States Patent [19]
Asai et al.

[11] Patent Number: 5,819,887
[45] Date of Patent: Oct. 13, 1998

[54] DRUM BRAKE DEVICE

[75] Inventors: Seiji Asai, Okazaki; Nobuhisa Arai; Yasushi Kobayashi, both of Nagoya, all of Japan

[73] Assignee: Nisshinbo Industries, Inc., Tokyo, Japan

[21] Appl. No.: 825,058

[22] Filed: Mar. 27, 1997

[30] Foreign Application Priority Data

Apr. 4, 1996 [JP] Japan ..................................... 8-108535
Jul. 17, 1996 [JP] Japan ..................................... 8-205478

[51] Int. Cl.$^6$ .................................................... F16D 51/02
[52] U.S. Cl. .......................... 188/78; 188/362; 188/106 F; 188/79.51; 188/216; 188/196 BA; 188/196 M; 188/340
[58] Field of Search ............................. 188/78, 336, 337, 188/338, 250 H, 29, 77 R, 74, 335, 340, 79.51, 79.54, 79.55, 79.56, 79.57–79.66, 196 R, 196 BA, 196 M, 76, 106 F, 152, 250 R, 250 B, 106 R, 205 R, 70 R, 216, 70 B, 362, 136

[56] References Cited

U.S. PATENT DOCUMENTS

| | | |
|---|---|---|
| 1,781,993 | 11/1930 | Wieczorak ................................ 188/362 |
| 1,837,573 | 12/1931 | Mox ............................................ 188/78 |
| 2,318,880 | 5/1943 | Mueller ...................................... 188/78 |
| 2,701,627 | 2/1955 | Murphy ...................................... 188/76 |
| 2,742,110 | 4/1956 | Super ......................................... 188/76 |
| 2,868,337 | 1/1959 | Holl ............................................ 188/78 |
| 3,388,776 | 6/1968 | Burnett ...................................... 188/76 |
| 3,414,091 | 12/1968 | Troy ........................................... 188/152 |
| 3,481,433 | 12/1969 | Lepelletier ............................ 188/18 R |
| 5,246,093 | 9/1993 | Wang .................................... 188/250 H |

*Primary Examiner*—Douglas C. Butler
*Attorney, Agent, or Firm*—Nikaido, Marmelstein, Murray & Oram LLP

[57] ABSTRACT

A drum brake device having a single brake shoe mounted to be movable on top of the back plate. One end of the brake shoe abuts against an anchor (10) and the other end interlocks with a shoe clearance adjustment device (14). A link (11) is supported so as to pivot in the central region of the brake shoe (3). One end of the link (11) is interlocked so as to be activated by a service brake actuator (12) itself activated when the service brake is applied, while the other end of the link (11) abuts against the anchor (10). When the brake drum is rotating in one direction, the other end of the brake shoe (3) is supported by the anchor (10), and when the brake drum is rotating in the reverse direction, the one end of the brake shoe (3) is supported by the shoe clearance adjustment device (14).

11 Claims, 13 Drawing Sheets

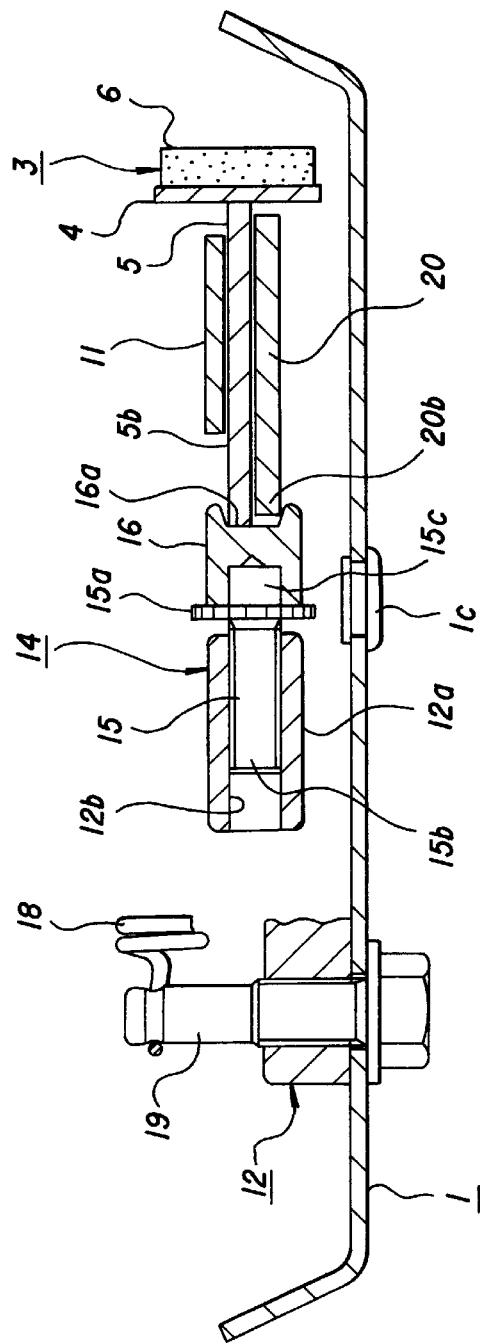
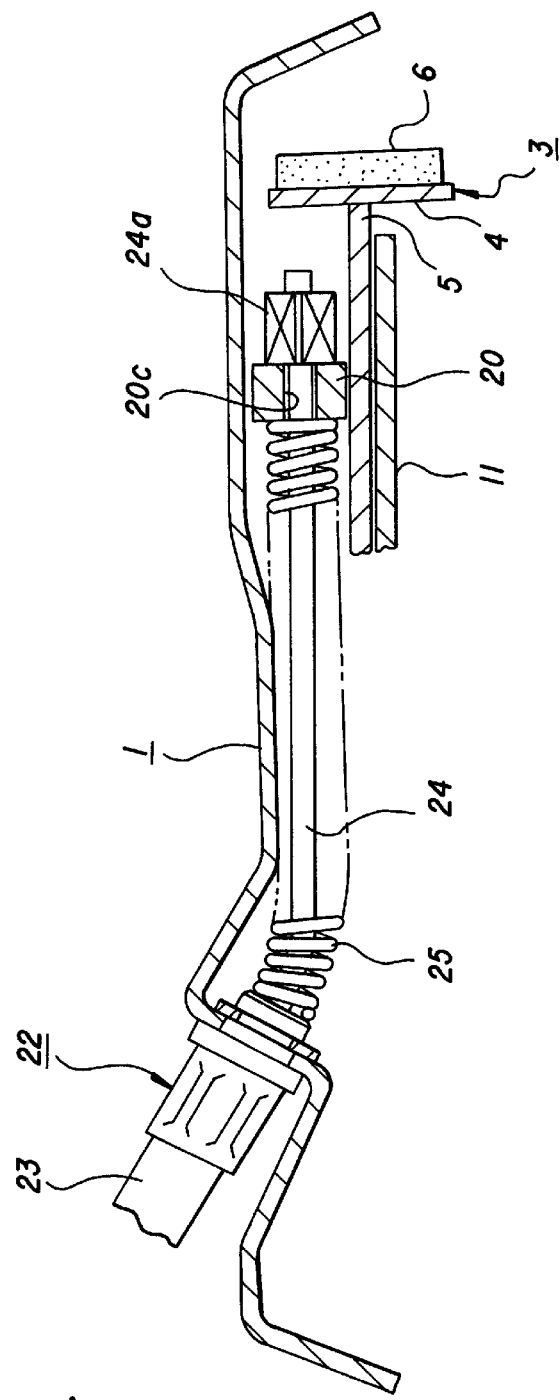
Fig.4
Fig.5

DRUM BRAKE DEVICE

BACKGROUND OF THE INVENTION

The present invention relates to a drum brake and, more specifically a drum brake wherein a leading-trailing (LT) type of drum brake device is widely used as the rear brake device for passenger vehicles and recreational vehicles. However, only about 20% of the braking force of a rear brake device is distributed in a front engine/front-wheel drive vehicle, and only about 30% is distributed in a front engine/rear-wheel drive vehicle. Moreover, the trailing shoe contributes only about 20% of the total brake shoe factor of a LT drum brake.

As an alternative, a drum brake device with only a single leading shoe has been disclosed in the publication of Japanese Utility Model Publication No. Heisei 4 (1992)-51225. Briefly, in this configuration, a single brake shoe and a pivotable component pivotally connecting a back plate in the central segment, are provided to face each other on a back plate. One end of the brake shoe and the pivotable component are each interlocked with one of two pistons housed in a both sides opening wheel cylinder. Meanwhile, the other end of the brake shoe and pivotable component are connected by a coupling device. The braking torque generated in the brake shoe is thus received directly by the piston and by the wheel cylinder as a result.

The drum brake device as known has several areas for improvement.

The wheel cylinder is equipped with two pistons, piston cups, and dust boots, making it impossible to provide a lighter and lower-cost device in comparison with the LT drum brake.

When the driver presses the service brake, the braking torque is applied when the two pistons of the wheel cylinder protrude out of each end of the cylinder, then the pistons are pushed back until the pistons impact with the cylinder body. Since this impact load will be applied to the brake shoe and the pivotable component, these components must be designed to be sufficiently sturdy to bear the load, and again weight and cost become a critical issue to be considered.

The noise generated as this impact load is applied can be disconcerting to the driver.

OBJECTS AND SUMMARY OF THE INVENTION

This invention was designed to resolve these potential problems, and to that end, provides a lighter and less expensive drum brake device.

Another object of this invention is to provide a drum brake device with a better design layout thereby facilitating a process of loading a device such as a rotational speed sensor used in an antilock brake system (ABS).

The present invention is a drum brake device in which a single brake shoe is mounted to be movable on top of the back plate; wherein each end of the brake shoe abuts and interlocks with an anchor and a shoe clearance adjustment device respectively, a link is supported so as to be pivotable in the central region of the brake shoe, and the operating force of the service brake actuator is transferred to the brake shoe through the pivot component.

This invention further provides when the brake drum is rotating in one direction, the brake shoe is supported by an anchor, and when the brake drum is rotating in the reverse direction, the brake shoe is supported by the shoe clearance adjustment device.

This invention further provides that the torque of the shoe return spring acting on the brake shoe with the pivot point with the link as the fulcrum is set so as to constantly support the rotation-exit side of the brake shoe relative to the forward direction of the brake drum.

This invention still further provides that the parking brake actuator, activated by the parking brake, is equipped so as to be able to spread open one side of the link.

This invention can also be equipped with an automatic shoe clearance adjustment device that senses the amount by which the brake shoe is opened, and automatically adjusts the clearance between the brake shoe and the brake drum.

This invention can have the supporting member that supports the other end of the link be an anchor.

This invention can have the supporting member that supports the other end of the link be a shoe clearance adjustment device.

This invention can have the service brake actuator be a one side opening wheel cylinder.

This invention can have a hollow protuberance integrally molded in the central region of the link, with the protuberance supported so as to be pivotable in a hole bored in the brake shoe.

This invention can include a shoe-hold device used to support the central segment of the link such that the link can pivot in the brake shoe.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 4 is a cross section view of FIG. 1 taken along the line IV—IV;

FIG. 5 is a cross section view of FIG. 1 taken along the line V—V;

DETAILED DESCRIPTION OF THE PREFERRED EMBODIMENTS

EXAMPLE 1

A first embodiment of this invention is explained with reference to FIGS. 1–6.

Figure 1:
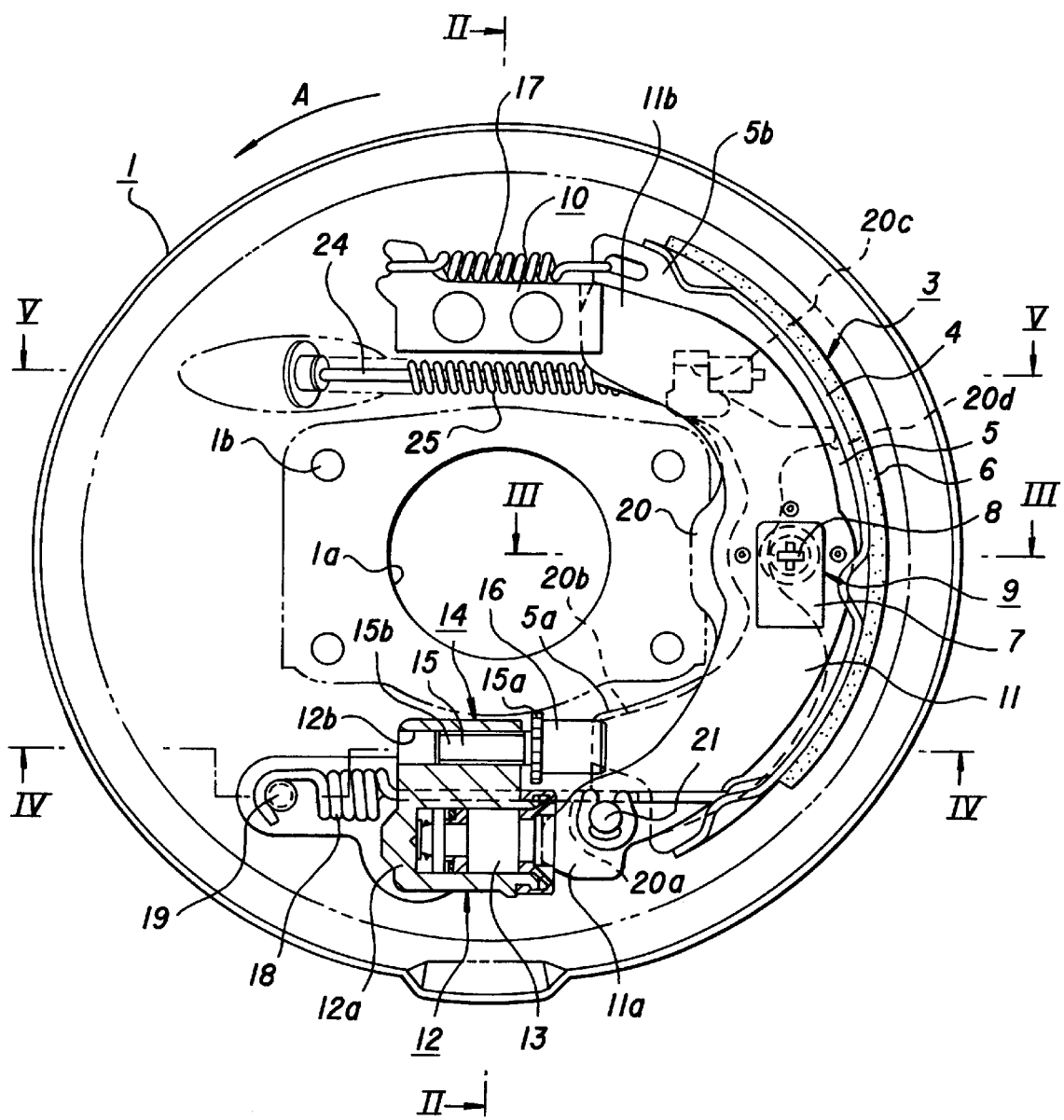
FIG. 1 is a plan view of the drum brake device of this invention as embodied in Example 1.
Figure 2:
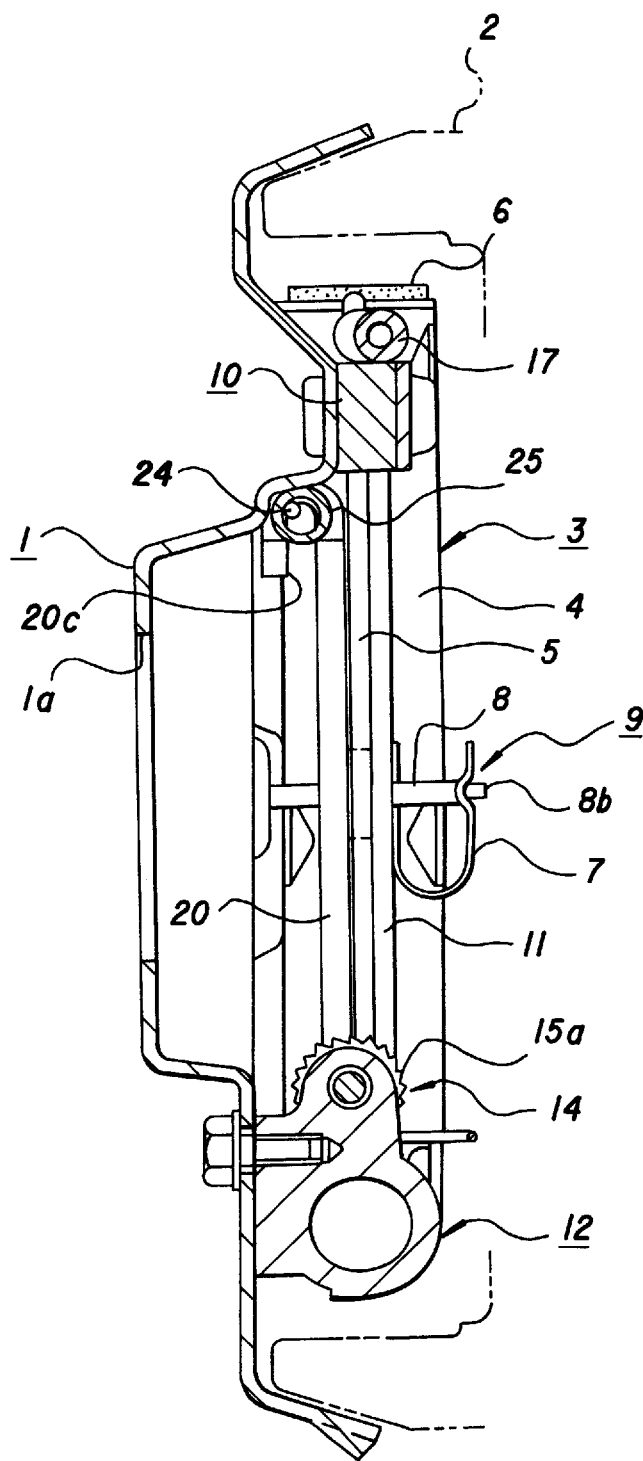
FIG. 2 is a cross section view of FIG. 1 taken along the line II—II.

As shown in FIGS. 1–2, the central hole 1a of the back plate 1 is freely inlaid in the axle, and affixed to the vehicle body by four bolts, not shown in the diagram, inserted through the bolt holes 1b. The brake drum 2 faces the back plate 1, and rotates in tandem with the wheels. A single brake shoe 3 is configured from a shoe rim 4, a shoe web 5 joined to the rim 4 to form a "T" in cross section, and a lining 6, affixed around the outer-surface of the shoe rim 4. Friction created as the lining is forced against the brake drum 2 produces the braking action.

The brake shoe 3 is mounted on top of the back plate 1 by a shoe-hold mechanism 9 which includes a plate spring 7 and a shoe-hold pin 8. One end 5a of the shoe web 5 abuts against and interlocks with a shoe clearance adjustment device 14, while the other end 5b abuts an anchor 10 which is affixed to the back plate 1.

A link 11 is superimposed on top of the shoe web 5, wherein one end 11a of the link 11 interlocks with the piston 13 of a one-side opening wheel cylinder 12, which is the service brake actuator. The other end 11b of the link 11 abuts against the anchor 10, which functions as a supporting member for the brake shoe 3 and the link 11. A hollow protuberance 11c, formed as a burr with a press, is integrally molded in the center of the link 11. The hollow protuberance 11c is pivoted such that it can pivot in the hole 5c bored in the shoe web 5.

Figure 3:
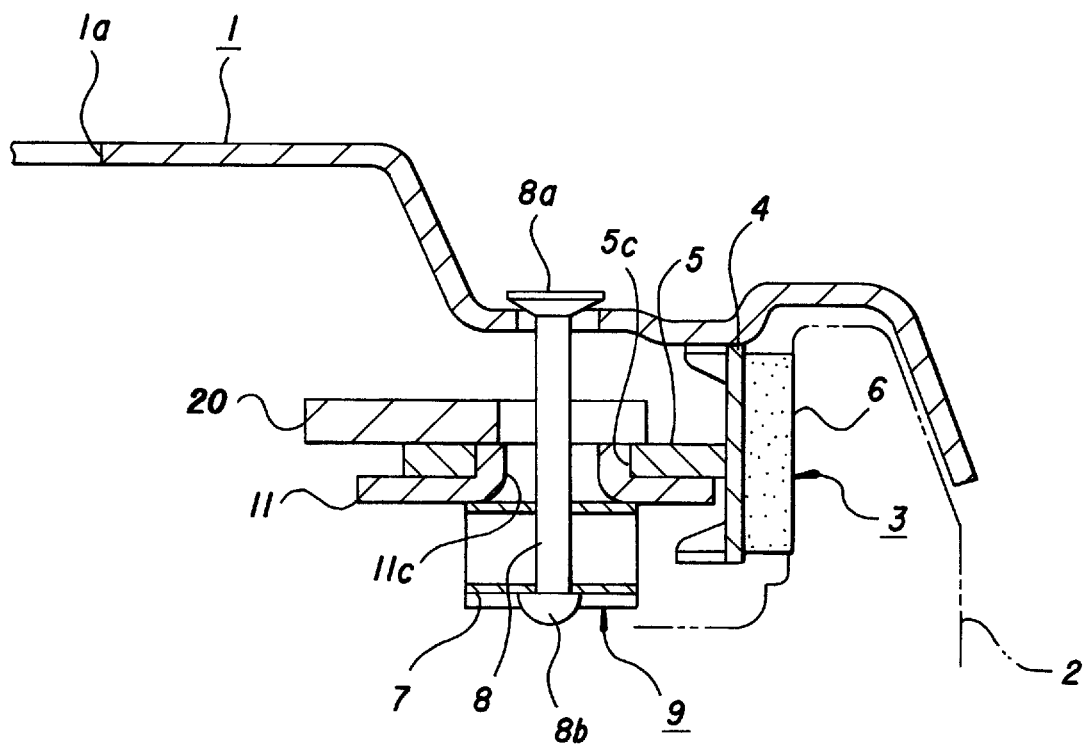
FIG. 3 is a cross section view of FIG. 1 taken along the line III—III.

FIG. 3 shows the pivot mechanism for the link 11. The head segment 8a of the shoe-hold pin 8 is interlocked in the hole of the back plate 1, while the latch segment 8b penetrates freely through the hollow protuberance 11c of link 11, and interlocks with the plate spring 7 mounted on top of the link 11. The elastic force of the plate spring 7 elastically secures the link 11 to the shoe web 5.

A shoe clearance adjustment device 14, as shown in FIGS. 1–2, adjusts the clearance between the brake drum 2 and the lining 6. It is comprised of an adjustment bolt 15 screwed into the cylinder body 12a of the wheel cylinder 12 and a sleeve 16. The adjustment device 14 is illustrated in detail in FIG. 4. A female thread 12b is formed inside a cavity molded parallel to the piston 13 inside the cylinder body 12a. The screw stem 15b on one end of the adjustment bolt 15 is screwed into the female thread 12b, while the other stem end 15c of the adjustment bolt is inserted so as to rotate inside the blind hole of the sleeve 16. A toothed adjustment wheel 15a is set in the central region of the adjustment bolt 15. A notched groove 16a in the sleeve 16 holds one end 5a of the shoe web 5 and with the central segment 20b of the brake lever 20, to be described later. The shoe web 5 abuts against the bottom of the notched groove 16a.

As shown in FIG. 1, a first shoe return spring 17 is stretched between the other end 5b of the shoe web 5 and a portion of the anchor 10. A second shoe return spring 18 is stretched between one end 5a of the shoe web 5 and the bolt 19 which bolts the wheel cylinder 12 to the back plate 1. The first and second shoe return springs 17, 18 are set so as to satisfy the following relational formula for the torque acting on brake shoe 3 when the brake drum rotates in the direction marked by the arrow A in FIG. 6 when the vehicle is advancing forward:

$F1{\times}L1{>}F2{\times}L2$, where:

F1=Mounted load of first return spring 17;
F2=Mounted load of second return spring 18;
L1=Distance between the pivot point of brake shoe 3 with link 11 and the first return spring 17;
L2=Distance between the pivot point of brake shoe 3 with link 11 and the second return spring 18.

That is, the shoe return springs 17, 18 are set such that, with the fulcrum being the pivot point with the link 11, the torque acting on the brake shoe 3 will be greater on the rotation-exit side of the brake shoe than on the pivot-entry side. This prevents the rotation-exit side of the brake shoe 3, relative to the direction of rotation of the brake drum, from separating from the anchor 10. Conversely, the springs should be set so that (F1×L1) is less than (F2×L2) if the brake drum is rotating in the opposite direction when the vehicle is advancing forward.

Next the parking brake, which is the parking brake actuator, is explained. As shown in FIG. 1, a brake lever 20 is set on the reverse side of the shoe web 5. The base end 20a of lever 20 is supported to be pivotable by a pin 21 set on one end 11a of the link 11. The neighboring central segment 20b of lever 20 is interlocked in the notched groove 16a of the sleeve 16 as shown in FIG. 4. A U-shaped groove 20c is bent in the free end of the brake lever 20. A neighboring stopper 20d abutting against the inner face of the shoe rim 4 regulates the return position of the lever 20.

FIG. 5 shows the connection of the remote control cable 22, wherein one end of the outer casing 23 is attached to the back plate 1, and the nipple end 24a affixed to one end of the inner cable 24 is latched in the U-groove 20c of brake lever 20. A coil spring 25, enclosing the inner cable 24, is compressed between the outer casing 23 and the U-groove 20c, and serves to provide the force between the inner cable 24 and the brake lever 20.

When the driver presses the brake pedal, the wheel cylinder 12 is pressurized, whereupon the piston 13 presses against one end 11a of the link 11. Link 11 turns with the point of abutment with anchor 10 on the other end 11b side as the fulcrum and the protuberance 11c acts on web 5 to move the brake shoe 3.

At this point, a torque differential arising from the shoe return springs 17, 18 is acting on the brake shoe 3, wherein one end 5a of the shoe web 5 opens, with the point of abutment against anchor 10 on the other end 5b side as the fulcrum, forcing the lining 6 against the rotating brake drum 2, and the friction so created will brake the vehicle.

Figure 6:
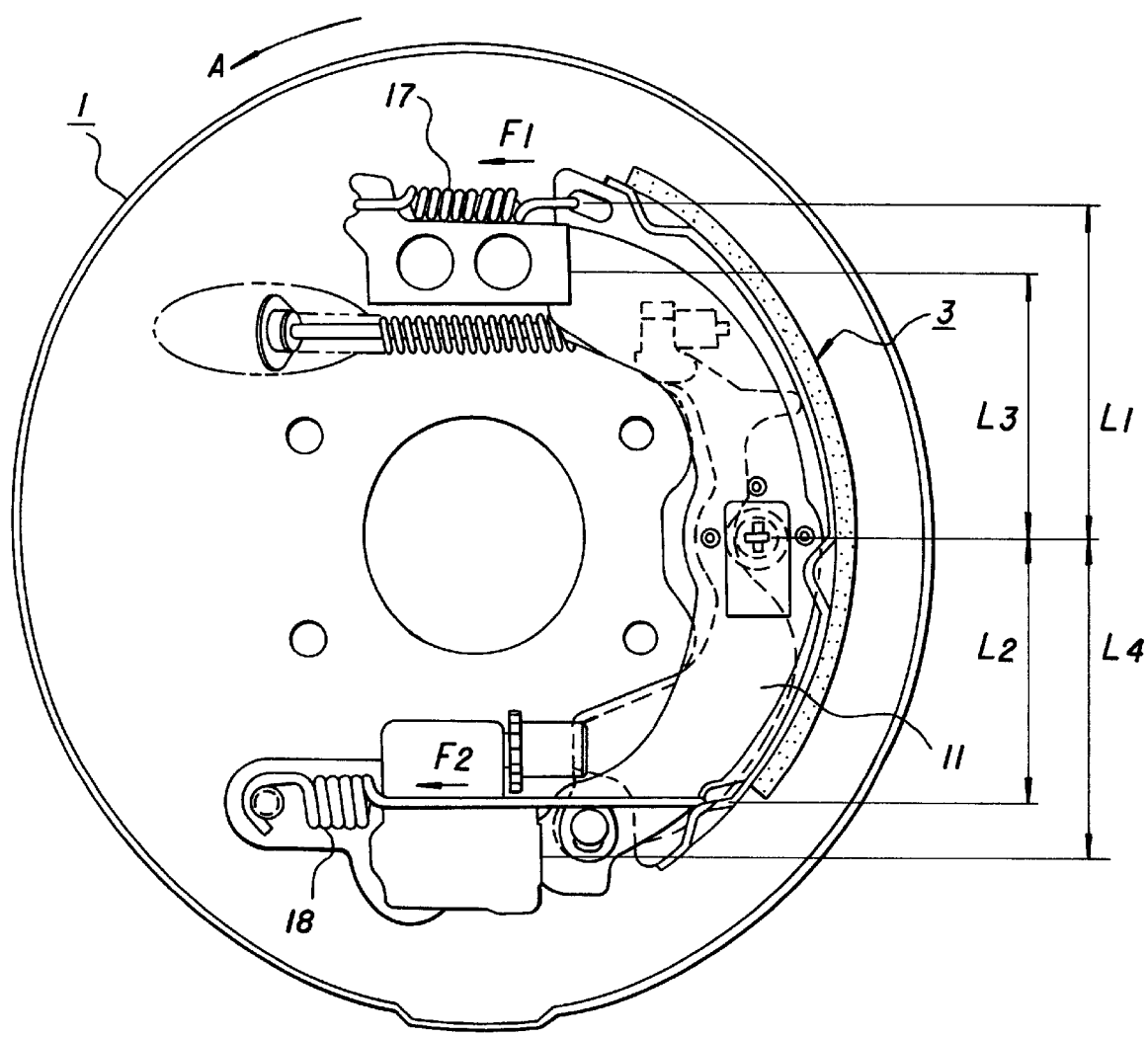
FIG. 6 is a model illustrating the torque acting on the brake shoe.

Thus it is clear that the force acting on the brake shoe can be easily changed with the lever ratio of the link 11 (see FIG. 6). The lever ratio is defined as:

$$\frac{L3+L4}{L3}, \text{where}$$

L3=Distance between the pivot point of link 11 and the point of support on the other end 11b side;
L4=Distance between the pivot point and the point of action.

If the brake drum 2 is rotating in direction A as shown in FIG. 1, the other end 5b of the shoe web 5 is supported by the anchor 10 and acts as the leading shoe with a self-servo property. Accordingly, the other end 5b of the shoe web 5 constantly abuts against the anchor 10, thus preventing the pivot-exit side of the brake shoe 3 relative to the direction of rotation of the brake drum from separating from the anchor 10.

If the brake drum 2 is rotating in the reverse direction, one end 5a of the shoe web 5 is supported by the shoe clearance adjustment device 14, and in the same manner as above, acts as the leading shoe with a self-servo property.

If the lining 6 becomes worn causing a large clearance with the brake drum 2, it can be easily replaced manually as follows. The plug 1c shown in FIG. 4 is removed, then a screw driver is inserted to turn the toothed adjustment wheel 15a in the direction to unscrew the adjustment bolt 15.

For example, when the hand brake lever inside the passenger compartment is applied, the inner cable 24 is pulled causing the brake lever 20 to rotate counterclockwise as shown in FIG. 1, with the point of abutment of its central segment 20b with the sleeve 16 as the fulcrum. This presses the lever against one end 11a of the link 11 via the pin 21. As a result, one end 5a of the shoe web 5 spreads open, using the point of abutment against the anchor 10 on the other end 5b side as the fulcrum, forcing the lining 6 against the rotating brake drum 2, and keeping the brakes locked.

EXAMPLE 2

Figure 7:
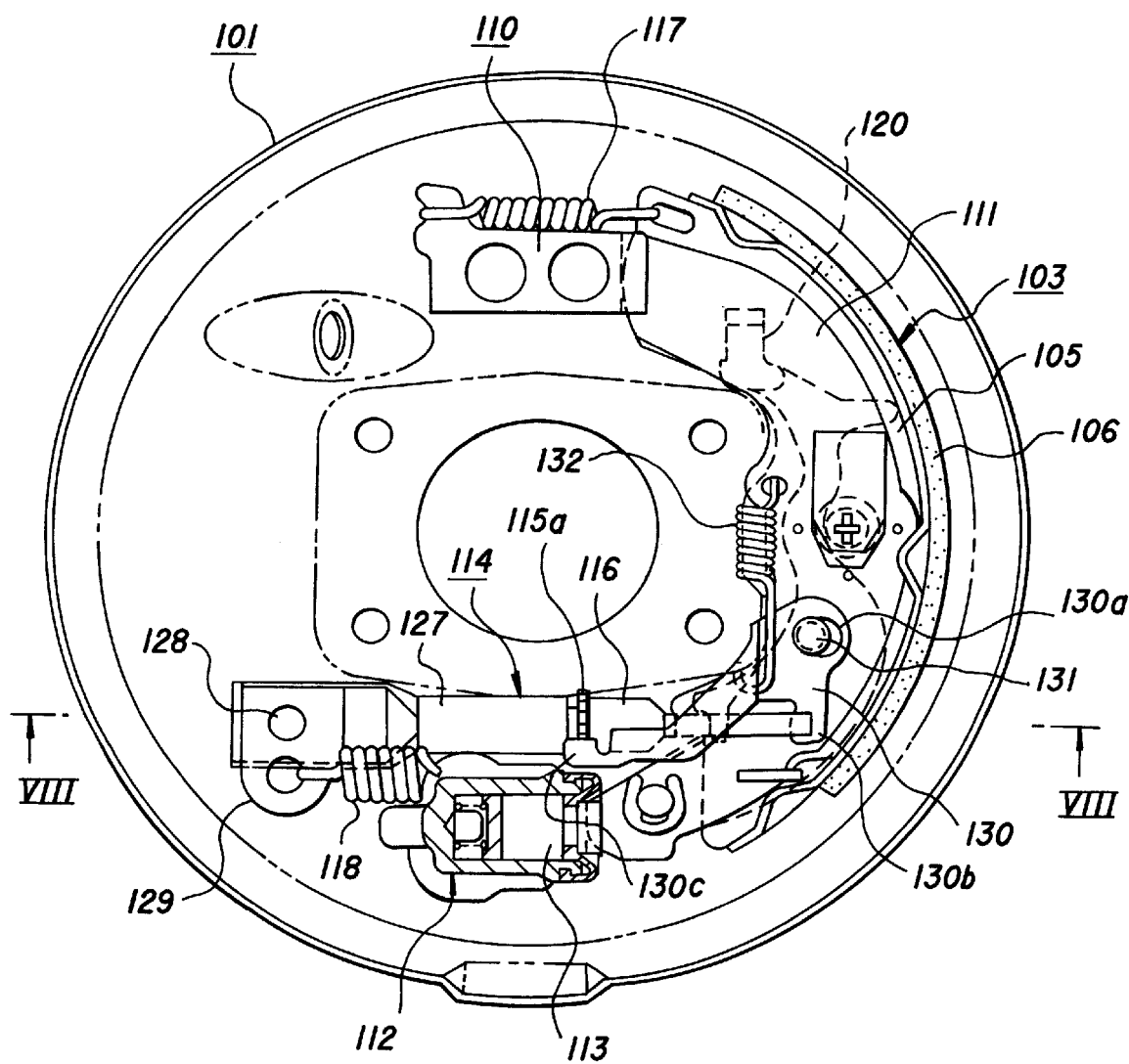
FIG. 7 is a plan view of the drum brake device of this invention as embodied in a second embodiment described as Example 2.
Figure 8:
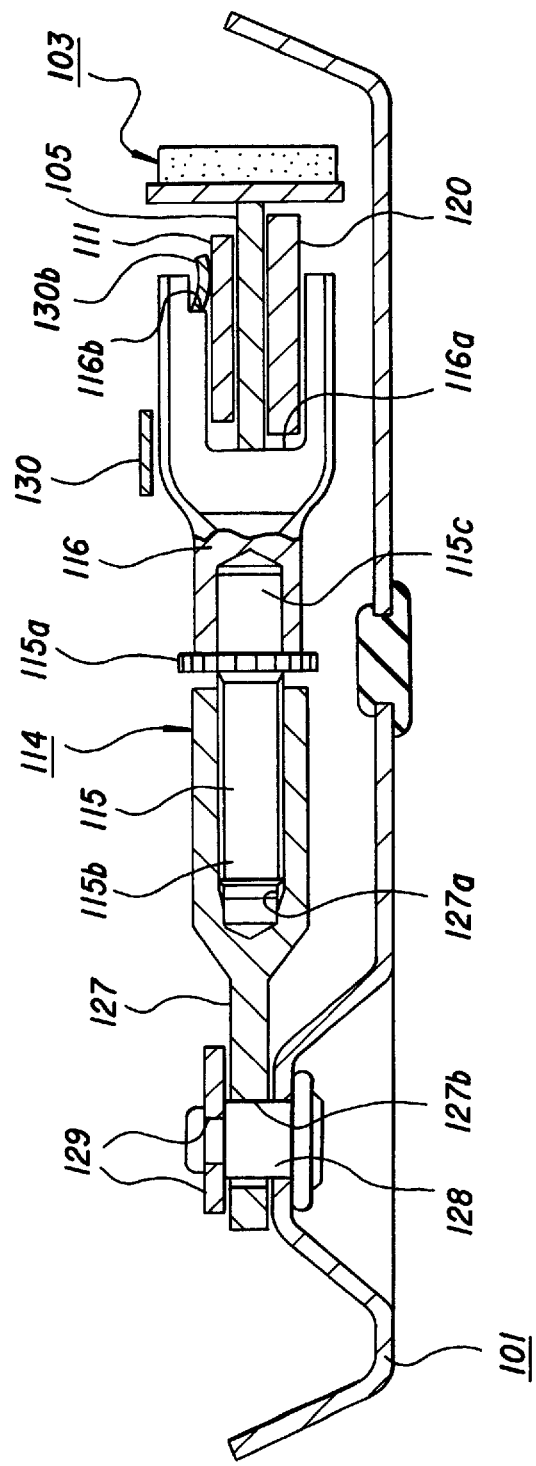
FIG. 8 is a is a cross section view of FIG. 7 taken along the line VIII—VIII.

A second example of the drum brake device equipped with an automatic shoe clearance adjustment function is explained next, with reference to FIGS. 7 and 8. Those components which are the same as in Example 1 are identified by a 100-series number and an explanation thereof is omitted here. These include the back plate 101, brake shoe 103, shoe web 105, lining 106, anchor 110, link 111, wheel cylinder (service brake actuator) 112, wheel cylinder piston 113, first shoe return spring 117, second shoe return spring 118, and brake lever (parking brake actuator) 120.

The shoe clearance adjustment device 114 of this embodiment includes an adjustment bolt 115, sleeve 116, and nut 127. As shown in FIG. 8, the adjustment bolt 115 has a toothed adjustment wheel 115a in the center, a screw stem 115b on one end which is screwed into the female threads 127a of nut 127, and a stem 115c on the other end which is inserted into the blind hole of sleeve 116 such that it can rotate.

A notched groove 116a, formed in the squeezable portion of the sleeve 116, holds the shoe web 105, brake lever 120, and link 111, where the shoe web 105 abuts against the bottom of the notched groove 116a. In addition, a pin 128, provided on the back plate 101, penetrates freely through the hole 127b formed in the squeezable portion of nut 127. A retainer 129, to prevent the nut 127 from separating and to act as a hook on which one end of the second shoe return spring 118 is latched, is pressed onto the end of the pin 128 protruding from the hole 129a.

Action during braking and the action of the shoe clearance manually adjustment is the same as that for Example 1, and an explanation thereof is omitted here.

The automatic shoe clearance adjustment device of this embodiment includes an adjustment lever 130 having a barrel-shaped hole. The barrel-shaped hole 130a in the central region of the adjustment lever 130 is supported such that it can pivot on a pin 131 set on either the link 111 or the shoe web 105. One arm 130b of the adjustment lever 130 is interlocked with the stepped-face 116b of the sleeve 116. The other arm 130c of the adjustment lever 130 is interlocked with the toothed adjustment wheel 115a. An adjustment spring 132 is stretched between the adjustment lever 130 and the link 111, and is energized to rotate the lever 130, with the pin 131 as the fulcrum, in the clockwise direction as shown in FIG. 7. The device 14 described previously can be used in place of this shoe clearance adjustment device 114.

When the brake pedal is pressed, the link 111 and the brake shoe 103 spread open with the anchor 110 as the fulcrum, and the pin 131 moves in tandem. At this time, the energizing force of the adjustment spring 132 presses one arm 130b of the adjustment lever 130 against the stepped face 116b, causing the other arm 130c to rotate in the clockwise direction as shown in FIG. 7.

If the lining 106 wears out, and the degree of rotation of the other arm 130c exceeds the pitch of the toothed adjustment wheel 115a, the adjustment bolt 115 is automatically adjusted by being screwed out of the nut 127 in an amount sufficient to keep a constant clearance between the brake drum and the lining 106.

When the parking brake is set, the force of the brake lever 120 increases the thrusting force of the shoe clearance adjustment device 114, but the adjustment spring 132 is not energized sufficiently to offset that increase, hence no clearance adjustment is made.

EXAMPLE 3

A third example of the drum brake device is explained next, with reference to FIGS. 9–13. Those components which are the same as in Example 1 are identified by a 200-series number and an explanation thereof is omitted here.

Figure 9:
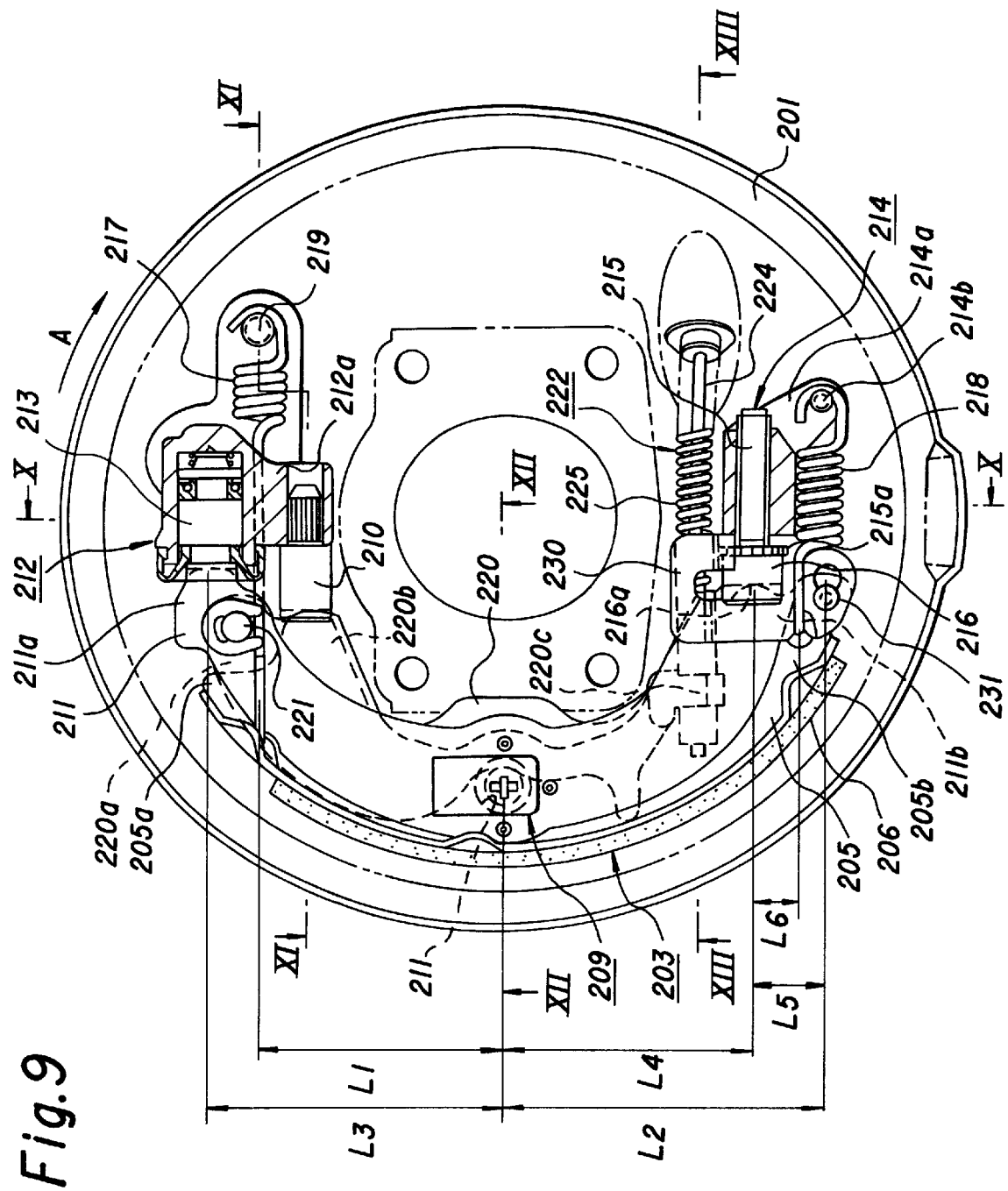
FIG. 9 is a plan view of the drum brake device of this invention as embodied in a third embodiment described as Example 3.
Figure 10:
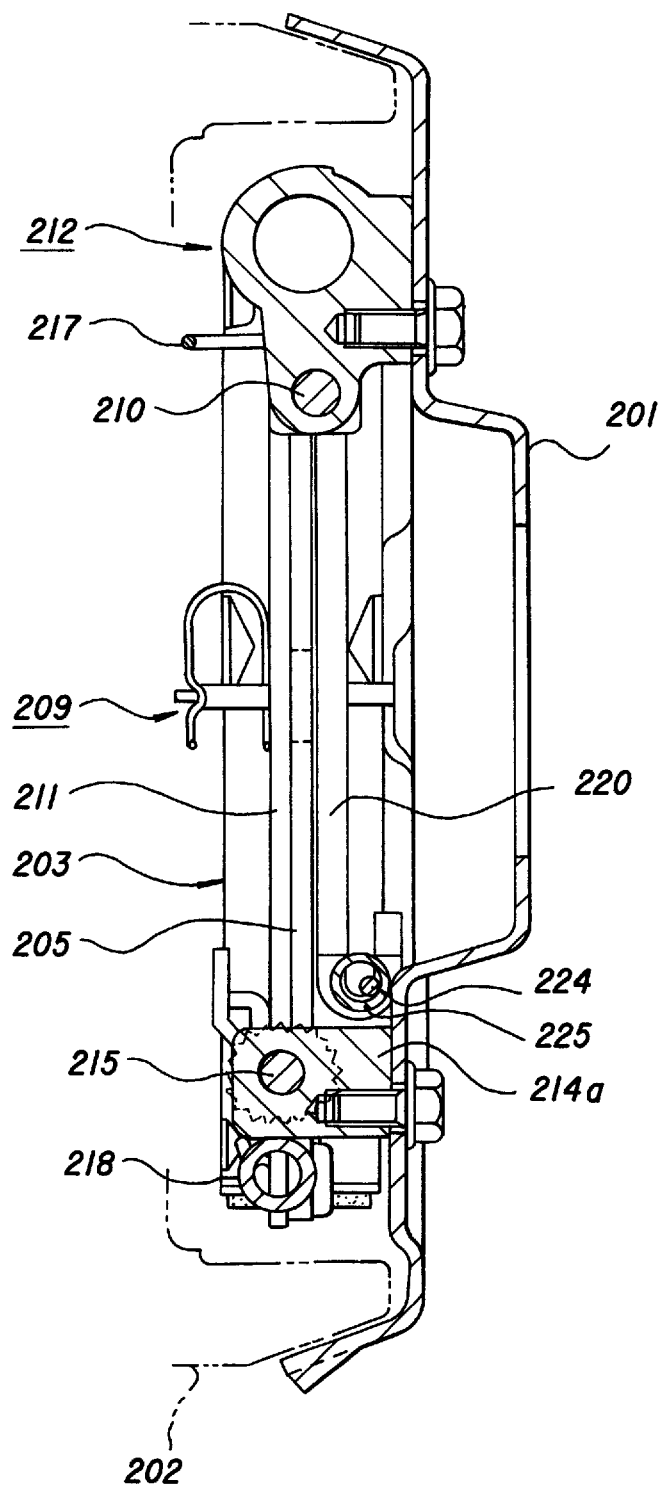
FIG. 10 is a cross section view of FIG. 9 taken along a line X—X.
Figure 11:
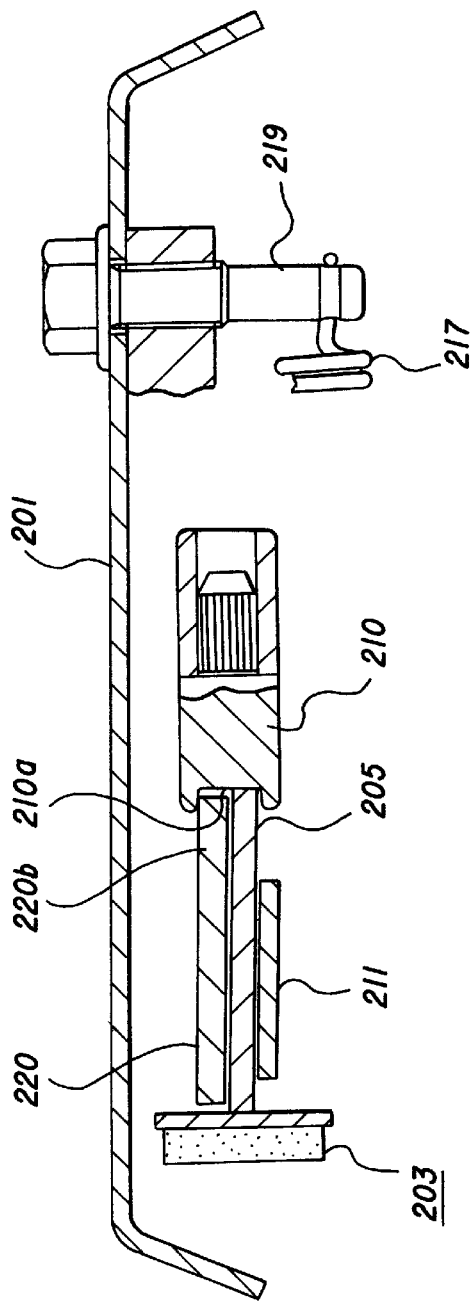
FIG. 11 is a cross section view of FIG. 9 taken along a line XI—XI.

The overall configuration is shown in FIG. 9. A one side opening wheel cylinder 212, which is the primary actuator, is set on the upper face of the back plate 201. A piston 213 and a parallel anchor 210 are integrally inlaid in the body 212a of the wheel cylinder 212, with the anchor 210 being on the radial inner side of the wheel cylinder towards the center of the brake.

A single brake shoe 203 is mounted on top of the back plate 201 by a shoe-hold mechanism 209. One end 205a of the shoe web 205 interlocks with and abuts against the anchor 210, and the other end 205b abuts and interlocks with the shoe clearance adjustment device 214.

The first shoe return spring 217 is stretched between one end 205a of the shoe web 205 and the cylinder mounting bolt 219. The second shoe return spring 218 is stretched between the central region of the adjustment lever 230 and the mounting bolt 214b for the adjustment body 214a.

Figure 12:
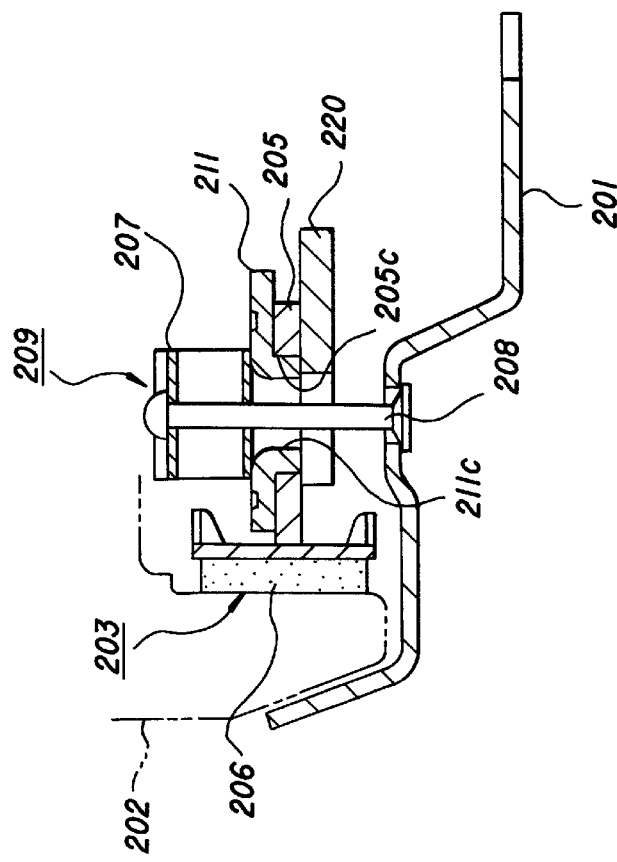
FIG. 12 is a cross section view of FIG. 9 taken along a line XII—XII.

A link 211 is superimposed on the shoe web 205. As shown in FIG. 12, a central hollow protuberance 211c is inlaid in the hole 205c of the shoe web 205, and is supported so as to be pivotable by the shoe-hold mechanism 209.

As shown in FIG. 9, one end 211a of the link 211 is interlocked so as to be activated by the piston 213 of the wheel cylinder 212. The other end 211b of link 211 abuts and interlocks with the bottom of a notched groove 216a of the sleeve 216 rotatably fitted around the end of the adjustment bolt 215 of the shoe clearance adjustment device 214. In this embodiment, the clearance adjustment device 214 is the member that supports the link 211.

Figure 14:
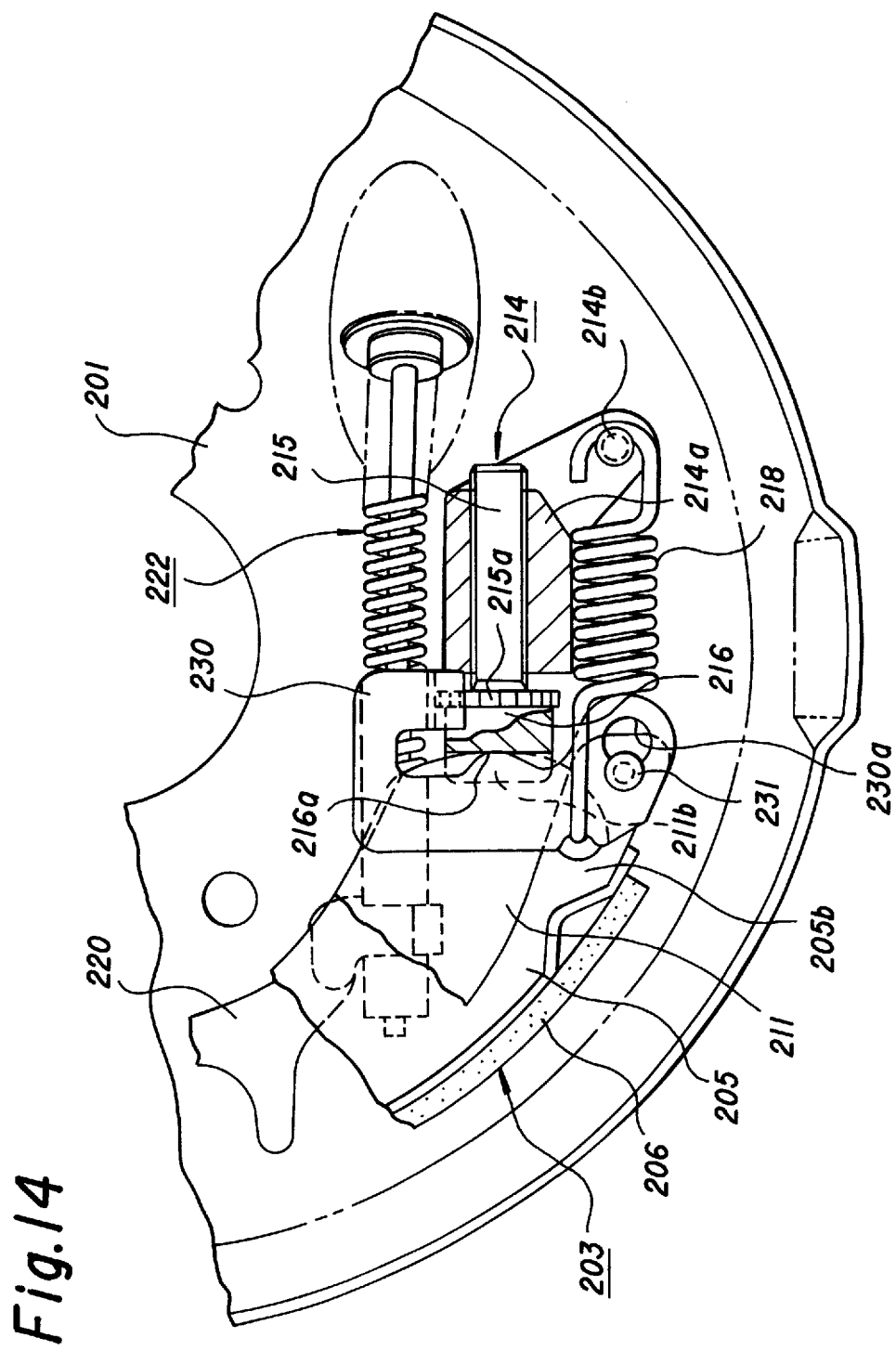
FIG. 14 is a partial plan view of the lower portion of the drum brake device as embodied in FIG. 9.

As shown in the enlarged diagram of FIG. 14, the shoe clearance adjustment device 214 includes an adjustment body 214a affixed on the back plate 201, and an adjustment bolt 215 screwed into the adjustment body 214a. A toothed adjustment wheel 215a is set in the center of the adjustment bolt 215.

The other end 205b of the shoe web 205 and the other end 211b of the link 211 are each interlocked with the bottom of notched groove 216a of the sleeve 216.

The second shoe return spring 218 serves a dual function of exerting a return force on the brake shoe 203, and as a spring to energize the adjustment lever 230 in the clockwise direction with the pin 231 as the fulcrum.

As shown in FIG. 9, a brake lever 220 is superimposed on the reverse side of the shoe web 205. The base end 220a of the lever 220 is supported to be pivotable by the pin 221 set on one end 211a of the link 211. The central segment 220b of the brake lever 220 is held in the notched groove 210a of the anchor 210 (see FIG. 11).

Figure 13:
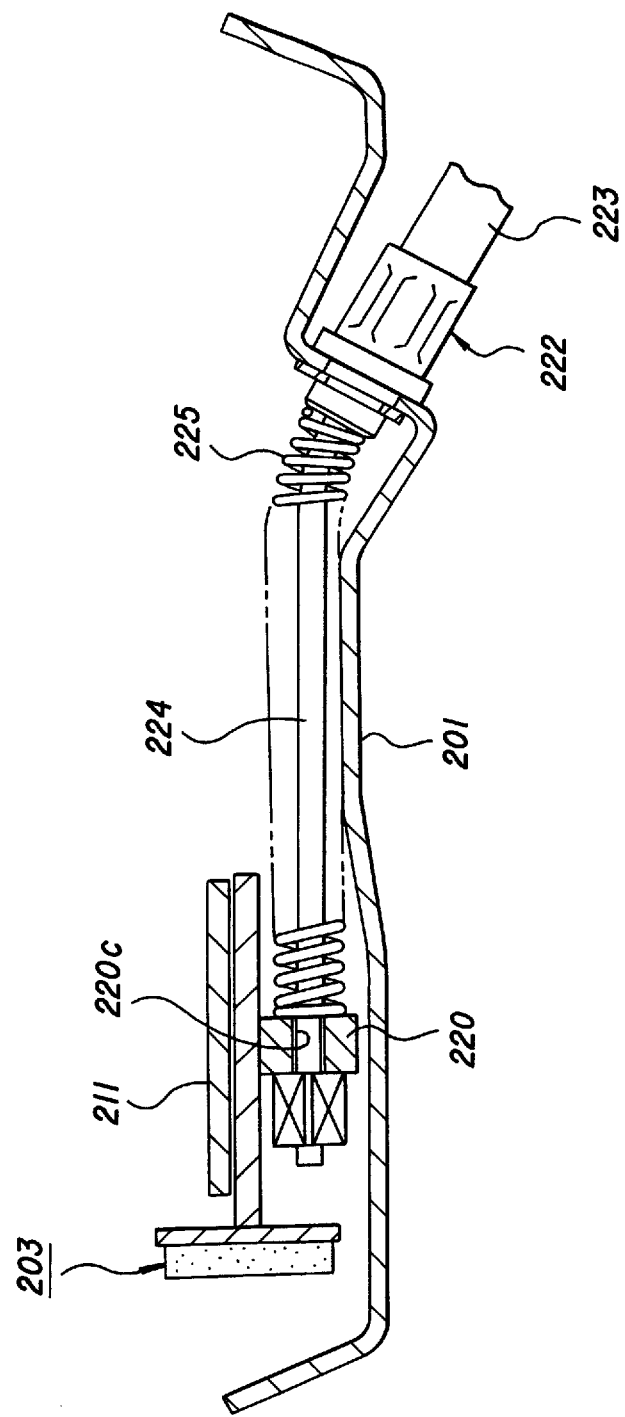
FIG. 13 is a cross section view of FIG. 9 taken along a line XIII—XIII.

As shown in FIG. 13, a U-shaped groove is provided on the free end 220c of the brake lever 220 by bending the end of the lever. The end of the inner cable 224 of the remote control cable 222 is housed and latched in the groove 220c. Also, a coil spring 225, which encloses an inner cable 224, is compressed between the outer casing 223 and the end 220c of the brake lever 220.

The automatic shoe clearance adjustment device is explained with reference to FIG. 14.

The barrel-shaped hole 230a of the adjustment lever 230 is supported such that it can pivot on the pin 231 set on the other end 205b of the shoe web 205. The central segment of the adjustment lever 230 abuts the bottom of the notched groove 216a of the sleeve 216 rotatably fitting around the adjustment bolt 215 and engages with the toothed adjustment wheel 215a of the adjustment bolt 215.

The torque acting on the brake shoe 203 when the brake drum is advancing forward in the direction of the arrow A is set so that:

$$F1 \times L1 > \frac{F2 \times L6}{L5} \times L2, \text{ where}$$

F1=Mounted load of first shoe return spring 217;
F2=Mounted load of second shoe return spring 218;
L1=Distance between the pivot point with link 211 of brake shoe 203 and first shoe return spring 217;
L2=Distance from the pivot point of the link 211 and the brake shoe 203 to the pivot point of the adjustment lever 230;
L3=Distance from the pivot point of the link 211 and the brake shoe 203 to the point of action on the side of one end 211a;
L4=Distance from the pivot point of the link 211 and the brake shoe 203 to the point of support on the side of the other end 211b;
L5=Distance between the point of abutment of the sleeve 216 with the adjustment lever 230 and its pivot point;
L6=Distance between point of abutment of the sleeve 216 with the adjustment lever 230 and second shoe return spring 218.

The actions of this third embodiment when the service brake or parking brake is applied differ from Example 1 and Example 2 only with respect to that of the supporting member which supports the link 211. That is, whereas the anchor 10 and 110 was the supporting member in Example 1 and Example 2 respectively, in this Example 3, the adjustment bolt 215, which forms part of the shoe clearance adjustment device 214, functions as the supporting member. Otherwise the operation of the service brake with the wheel cylinder 212 and the operation of the parking brake with the brake lever 220 is the same, and an explanation thereof is omitted here.

When either the service brake or parking brake is applied, the torque differential between the first shoe return spring 217 and the second shoe return spring 218 causes the other end 205b side of the brake shoe 203 to spread open. At this point, the adjustment lever 230 rotates clockwise with the point of abutment with the sleeve 216 as the fulcrum. If the lining 206 is worn, and the degree of rotation of the adjustment lever 230 exceeds the pitch of the toothed adjustment wheel 215a, the adjustment bolt 215 rotates, thereby automatically maintaining a constant clearance between the brake drum 202 and the lining 206.

EXAMPLE 4

Figure 15:
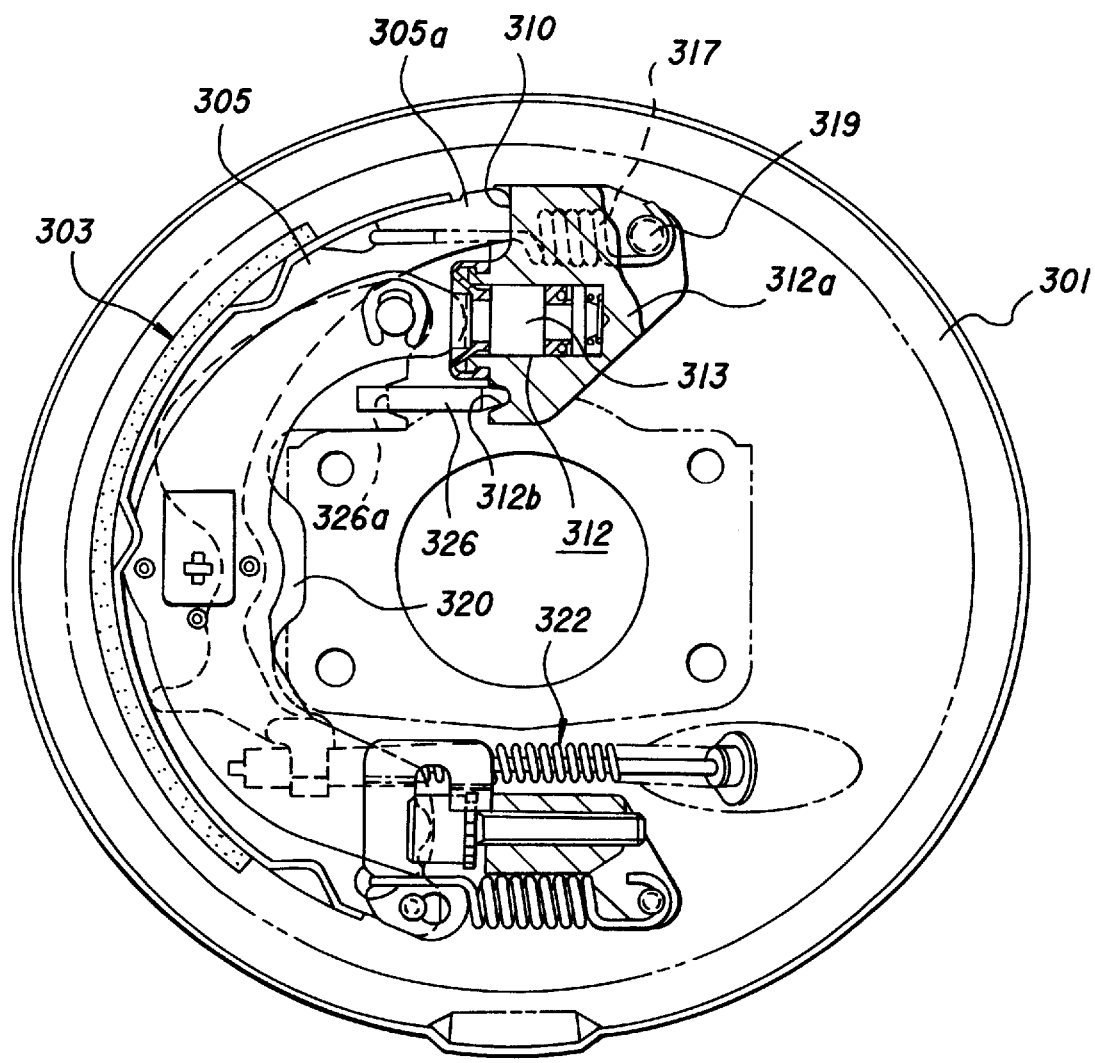
FIG. 15 is a plan view of the drum brake device of this invention as embodied in a fourth embodiment described as Example 4.
Figure 1:
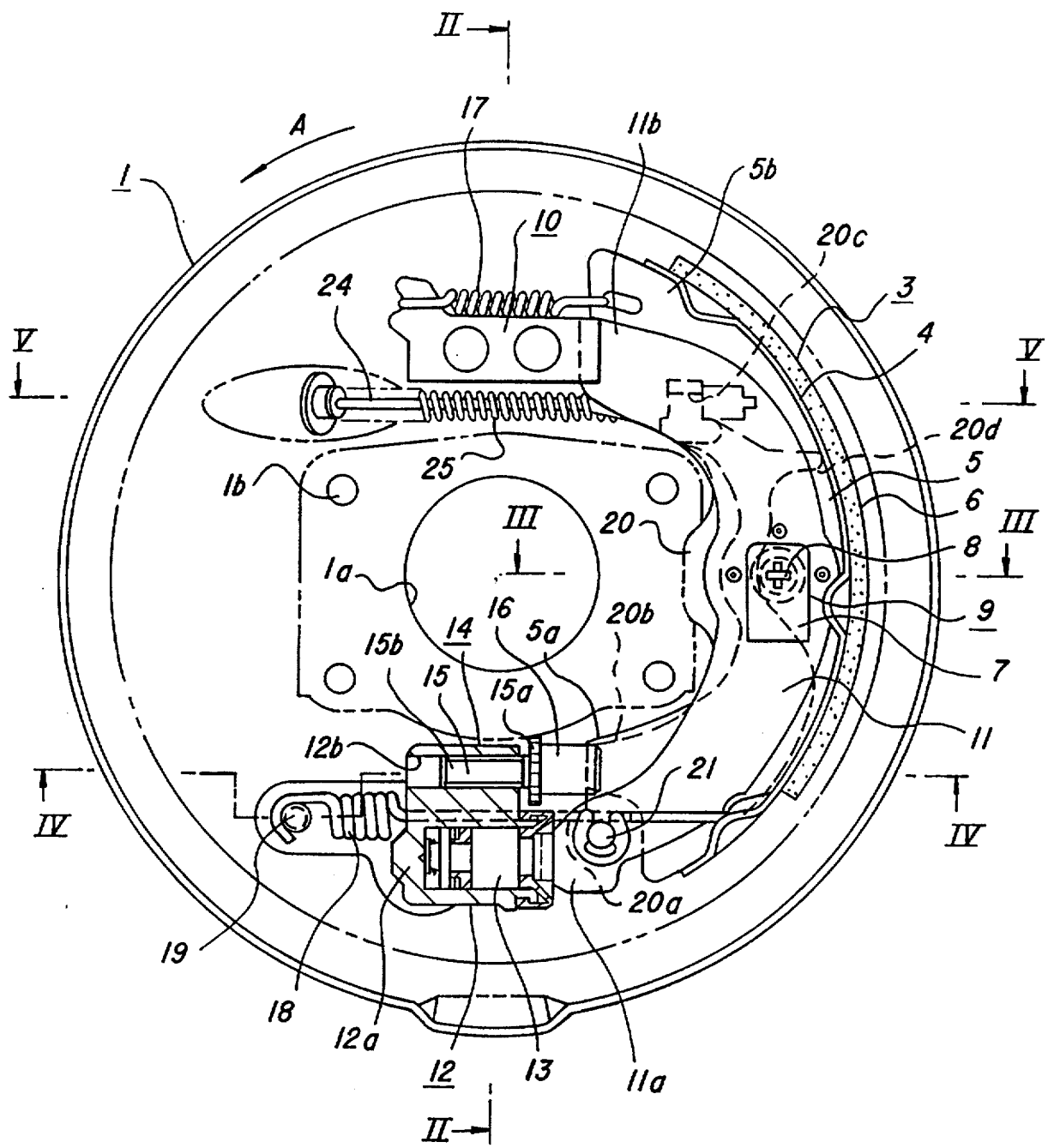
Figure 6:
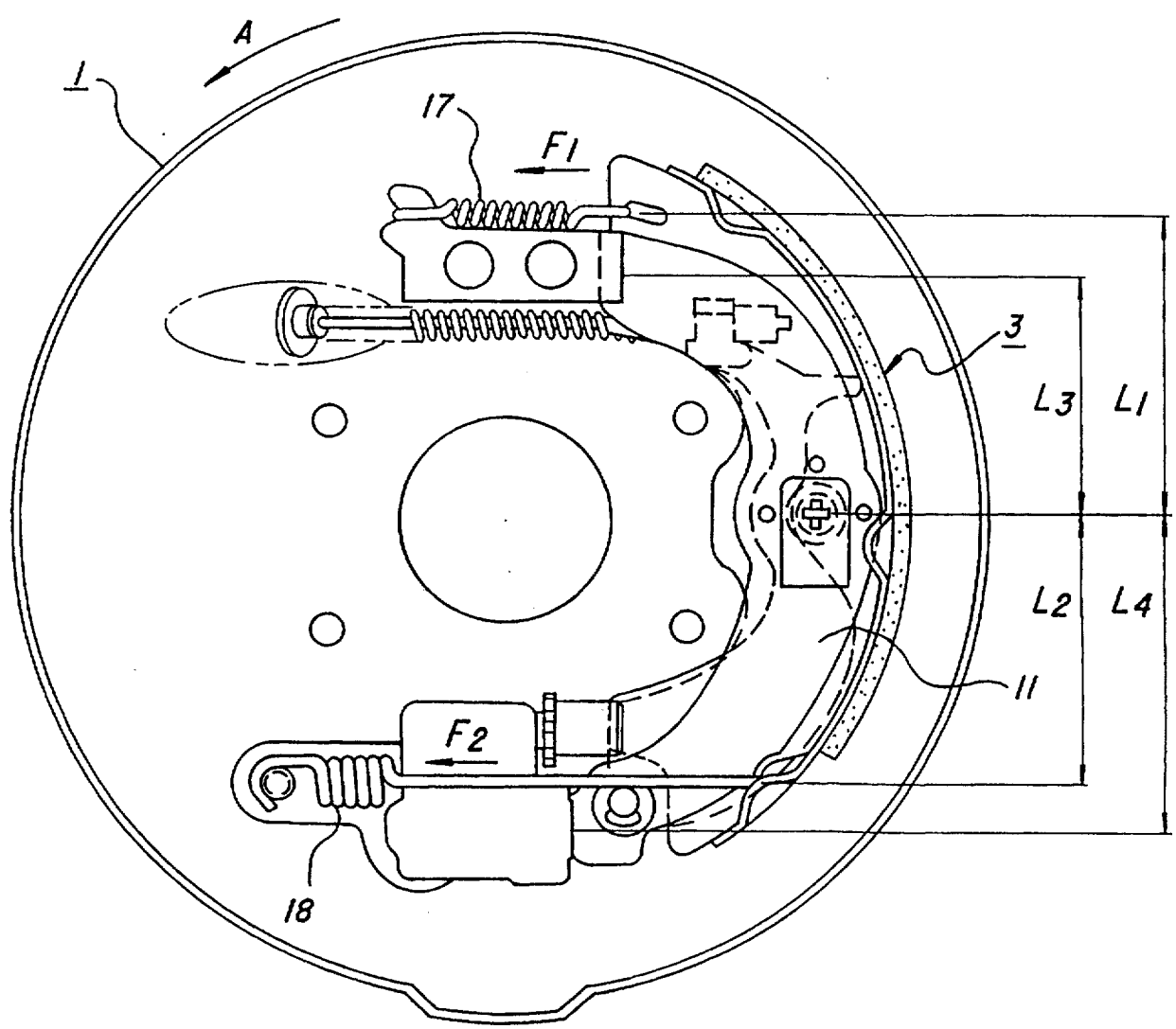
Figure 7:
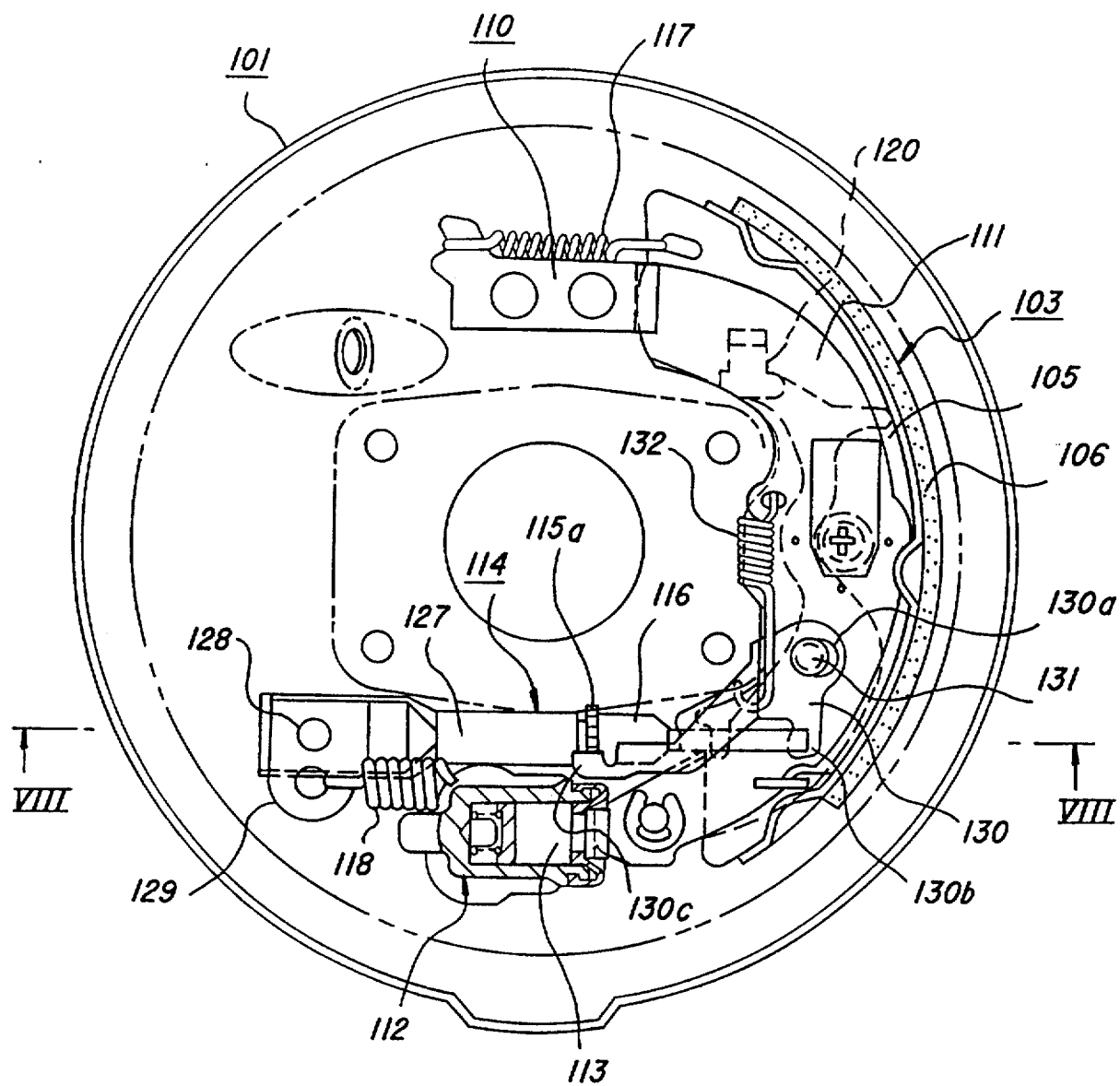
Figure 9:
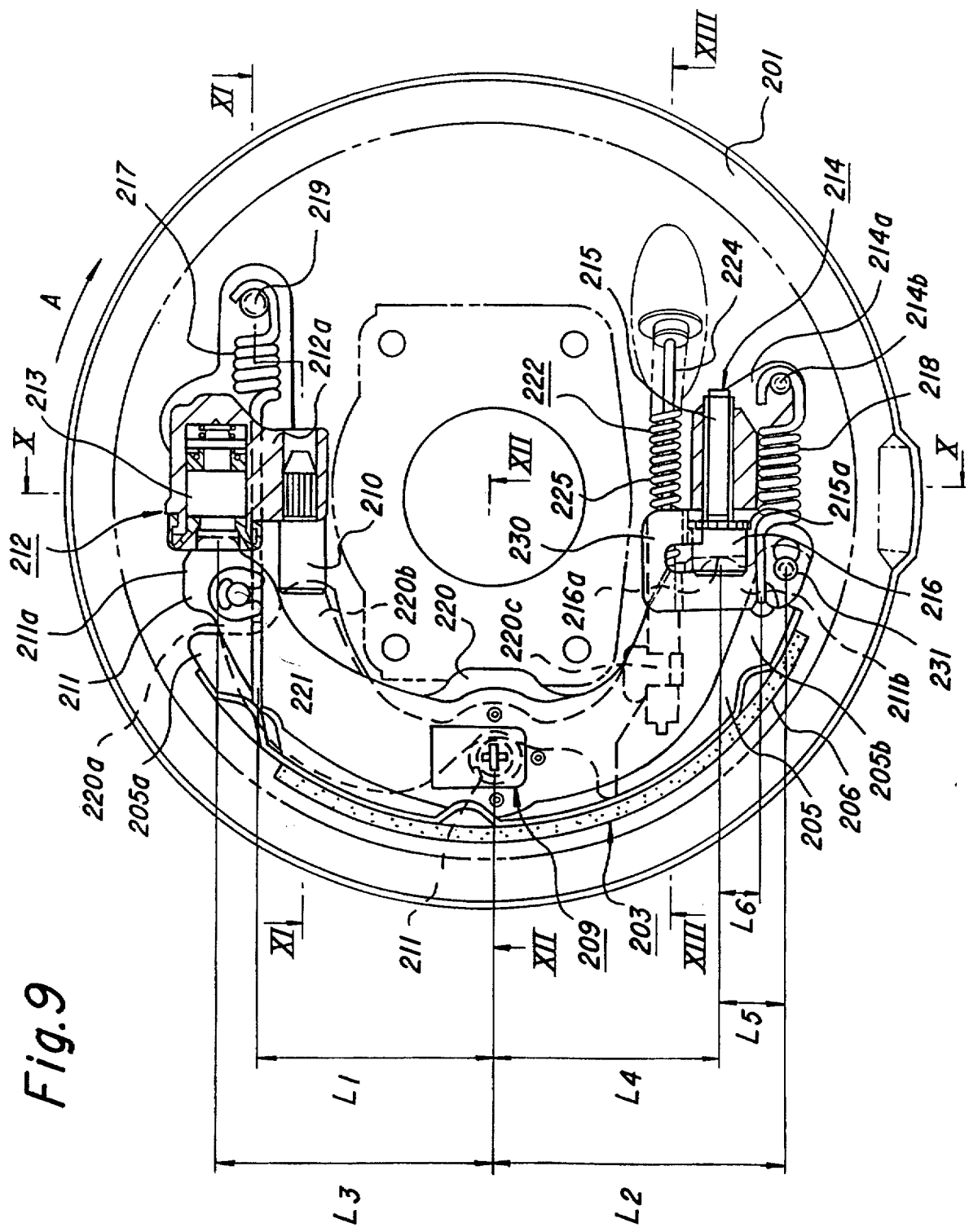
Figure 15:
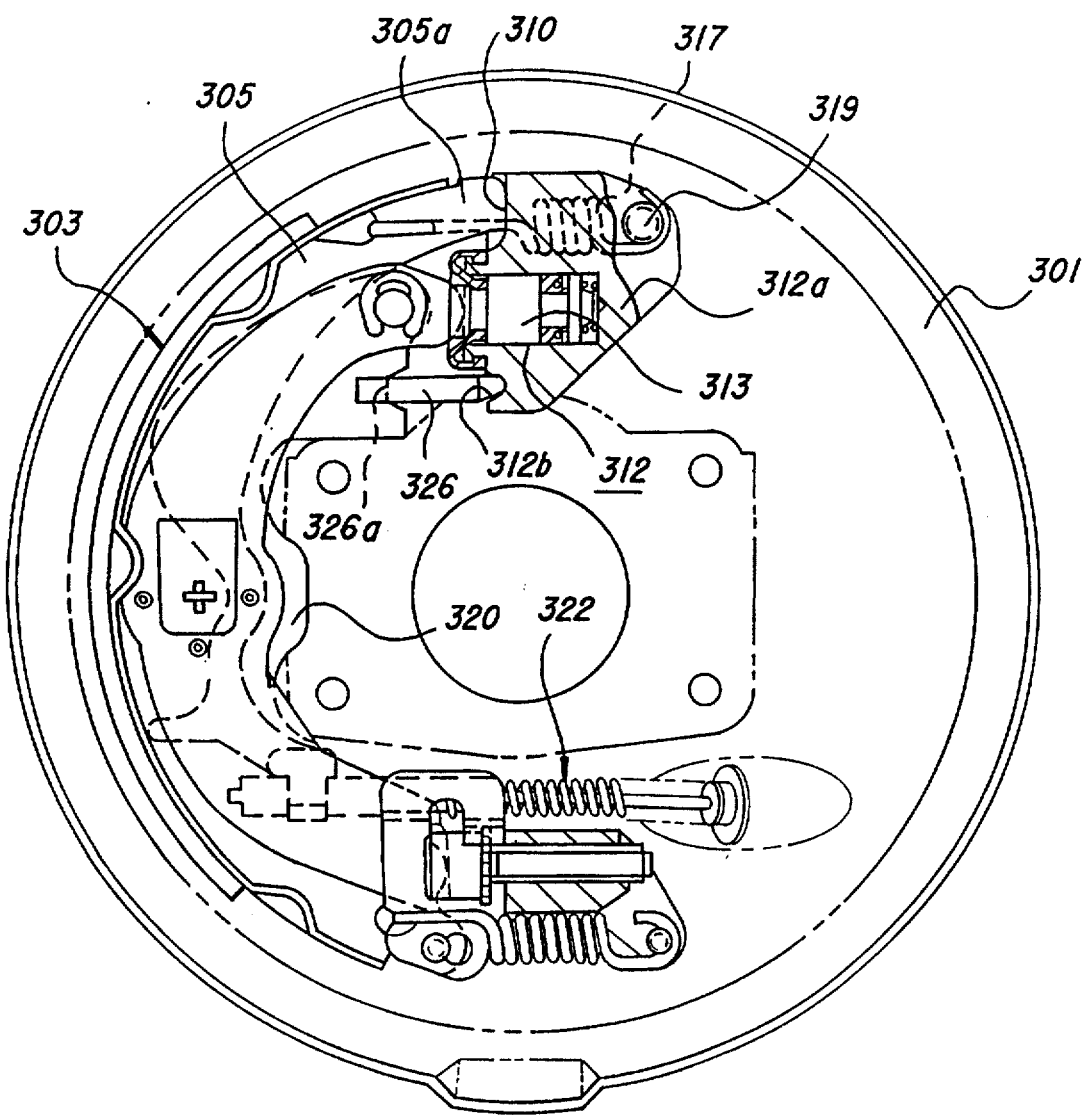

FIG. 15 illustrates a modified version of Example 3 in which the parallel anchor and the wheel cylinder are reversed in position with respect to the center of the brake. Those components which are the same as in Example 1 and Example 2 are identified by a 300-series number and an explanation is thereof omitted here.

The piston 313 is housed in a one side opening wheel cylinder 312 affixed on top of the back plate 301. A groove is molded in the cylinder body 312a on the radial outer side from the brake center of the piston 313. The groove forms the supporting member 310 that supports one end 305a of the brake shoe 303. In addition, a rod 326 is positioned between the brake lever 320 and the cylinder body 312a. The right end of the rod 326 is inserted so as to be pivotable in the groove 312b of the cylinder body 312a. A notched groove 326a of the other end of the rod 326 engages in the brake lever 320. The rod 326 functions as the fulcrum for the brake lever 320 to pivot when the control cable 322, the parking brake actuator, is pulled.

This invention is by no means limited to the embodiments described above. For example, the position of the brake lever and the link relative to the shoe web can be reversed, or the brake drum can be set to rotate in the reverse direction from that indicated by arrow A when the vehicle is advancing forward. In the latter case, the pivot-exit side of the brake shoe relative to the brake drum can be set so as to constantly abut the shoe clearance adjustment device by reversing the torque of the shoe return springs acting on the brake shoe. As well, the service brake actuator can be positioned either above or below the vehicle body.

Another possibility is to increase the force of the adjustment spring, which will enable the shoe clearance to be automatically adjusted when the parking brake is activated. The possibility of many other variations should be evident to those people technically skilled in this industry.

This invention provides the certain particular advantages.

A single brake shoe can act as a leading shoe with self-servo properties when the vehicle is either advancing forwardly or backwardly by using a one side opening wheel cylinder. This reduces the number of parts including the number of the brake shoe which is required to compose a wheel cylinder device.

The pivot-exit side of the brake shoe relative to the forward direction of rotation of the brake drum is constantly supported, whether the service brake or parking brake is activated. Thus no impact load is applied, and the strength of the nearby components need not be reinforced; again enabling a lighter and less expensive device.

No impact load is applied, thereby eliminating disconcerting noise.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

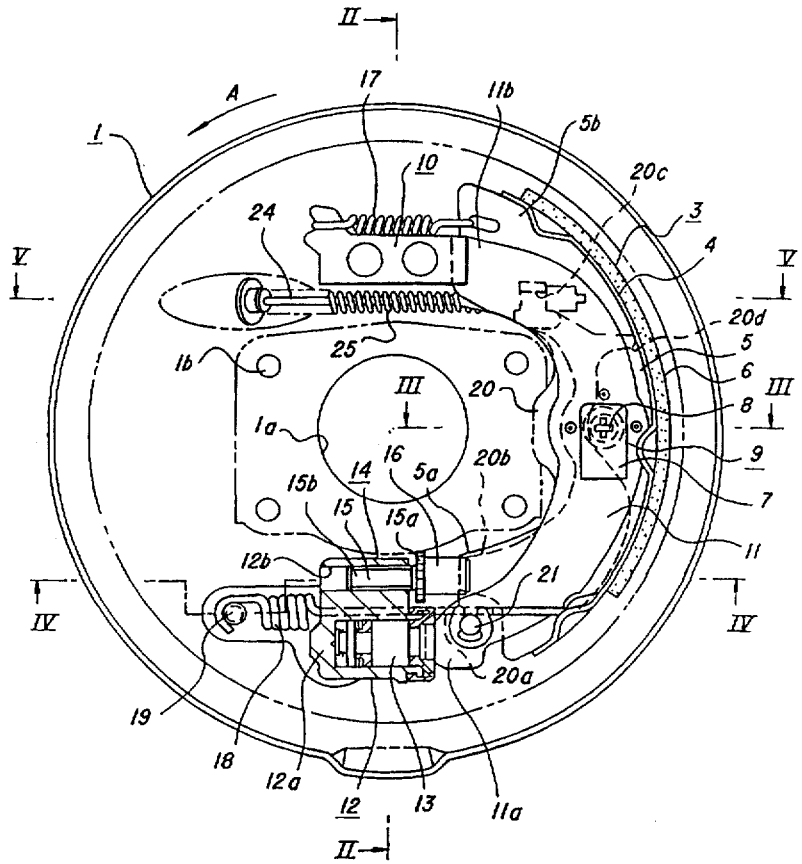

What we claim is:

1. A drum brake device for a brake drum comprising:

a back plate;

an anchor mounted on said back plate;

a shoe clearance adjustment device mounted said back plate;

a single brake shoe mounted to be movable on top of the back plate, one end of said brake shoe abutting and interlocking with said anchor and the other end of said brake shoe abutting and interlocking with said shoe clearance adjustment device respectively;

a service brake actuator mounted on said back plate;

a link pivotably supported at a pivot point at the central region of said brake shoe, one end of said link being connected so as to be activated by said service brake actuator itself activated when a service brake is applied, while the other end of said link being supported by a supporting member, wherein the force of the service brake actuator transferred to the link is transferred to said brake shoe through the pivot component.

2. A drum brake device as claimed in claim 1, wherein when the brake drum is rotating in one direction, said brake shoe is supported by said anchor, and when the brake drum is rotating in a reverse direction, said brake shoe is supported by said shoe clearance adjustment device.

3. A drum brake device as claimed in claim 1, further comprising a shoe return spring anchored at one end to said back plate and engaged at the other end with said brake shoe, wherein the torque of the shoe return spring acting on said brake shoe with the pivot point with said link as the fulcrum is arranged so as to constantly support a pivot-exit side of the brake shoe relative to a forward direction of rotation of the brake drum.

4. A drum brake device as claimed in claim 2, further comprising a shoe return spring anchored at one end to said back plate and engaged at the other end with said brake shoe, wherein the torque of the shoe return spring acting on said brake shoe with the pivot point with said link as the fulcrum constantly supports a pivot-exit side of the brake shoe relative to the forward direction of rotation of the brake drum.

5. A drum brake device as claimed in claim 1, further comprising a parking brake actuator, activated by a parking brake, engaging with said link, the force of the parking brake actuator transferred to the link being transferred to said brake shoe to move said brake shoe radially outwardly.

6. A drum brake device as claimed in claim 1, further comprising an automatic shoe clearance adjustment device that senses the amount by which said brake shoe is opened, and automatically adjusts a clearance between a lining of said brake shoe and the drum.

7. A drum brake device as claimed in claim 1, wherein the supporting member that supports the other end of the link is said anchor.

8. A drum brake device as claimed in claim 1, wherein the supporting member that supports the other end of the link is said shoe clearance adjustment device.

9. A drum brake device as claimed in claim 1, wherein said service brake actuator is a one side opening wheel cylinder.

10. A drum brake device as claimed in claim 1, wherein a hollow protuberance is integrally formed in the central region of the link, and said protuberance pivotably supported in a hole bored in said brake shoe.

11. A drum brake device as claimed in claim 10, further comprising a shoe-hold device supporting a central segment of said link to be pivotable in said brake shoe.

* * * * *

UNITED STATES PATENT AND TRADEMARK OFFICE
CERTIFICATE OF CORRECTION

PATENT NO. : 5,819,887
DATED : October 13, 1998
INVENTOR(S) : Seiji ASAI, et al

It is certified that error appears in the above-identified patent and that said Letters Patent is hereby corrected as shown below:

The title page, showing the illustrative figure, should be deleted and substitute therefor the attached title page.

In the Drawings, consisting of Figures 1,6,7,9 and 15, should be deleted to be replaced with the drawings sheets, consisting of Figures 1,6,7,9 and 15

Signed and Sealed this

Fifth Day of October, 1999

*Attest:*

Q. TODD DICKINSON

*Attesting Officer*   *Acting Commissioner of Patents and Trademarks*

United States Patent [19]
Asai et al.

[11] Patent Number: 5,819,887
[45] Date of Patent: Oct. 13, 1998

[54] DRUM BRAKE DEVICE

[75] Inventors: Seiji Asai, Okazaki; Nobuhisa Arai; Yasushi Kobayashi, both of Nagoya, all of Japan

[73] Assignee: Nisshinbo Industries, Inc., Tokyo, Japan

[21] Appl. No.: 825,058

[22] Filed: Mar. 27, 1997

[30] Foreign Application Priority Data

Apr. 4, 1996 [JP] Japan .................................. 8-108535
Jul. 17, 1996 [JP] Japan .................................. 8-205478

[51] Int. Cl.$^6$ .................................................. F16D 51/02
[52] U.S. Cl. .................. 188/78; 188/362; 188/106 F; 188/79.51; 188/216; 188/196 BA; 188/196 M; 188/340
[58] Field of Search ............... 188/78, 336, 337, 188/338, 250 H, 29, 77 R, 74, 335, 340, 79.51, 79.54, 79.55, 79.56, 79.57–79.66, 196 R, 196 BA, 196 M, 76, 106 F, 152, 250 R, 250 B, 106 R, 205 R, 70 R, 216, 70 B, 362, 136

[56] References Cited

U.S. PATENT DOCUMENTS

| | | | |
|---|---|---|---|
| 1,781,993 | 11/1930 | Wieczorak | 188/362 |
| 1,837,573 | 12/1931 | Mox | 188/78 |
| 2,318,880 | 5/1943 | Mueller | 188/78 |
| 2,701,627 | 2/1955 | Murphy | 188/76 |
| 2,742,110 | 4/1956 | Super | 188/76 |
| 2,868,337 | 1/1959 | Holl | 188/78 |
| 3,388,776 | 6/1968 | Burnett | 188/76 |
| 3,414,091 | 12/1968 | Troy | 188/152 |
| 3,481,433 | 12/1969 | Lepelletier | 188/18 R |
| 5,246,093 | 9/1993 | Wang | 188/250 H |

Primary Examiner—Douglas C. Butler
Attorney, Agent, or Firm—Nikaido, Marmelstein, Murray & Oram LLP

[57] ABSTRACT

A drum brake device having a single brake shoe mounted to be movable on top of the back plate. One end of the brake shoe abuts against an anchor (10) and the other end interlocks with a shoe clearance adjustment device (14). A link (11) is supported so as to pivot in the central region of the brake shoe (3). One end of the link (11) is interlocked so as to be activated by a service brake actuator (12) itself activated when the service brake is applied, while the other end of the link (11) abuts against the anchor (10). When the brake drum is rotating in one direction, the other end of the brake shoe (3) is supported by the anchor (10), and when the brake drum is rotating in the reverse direction, the one end of the brake shoe (3) is supported by the shoe clearance adjustment device (14).

11 Claims, 13 Drawing Sheets